UNITED STATES PATENT OFFICE.

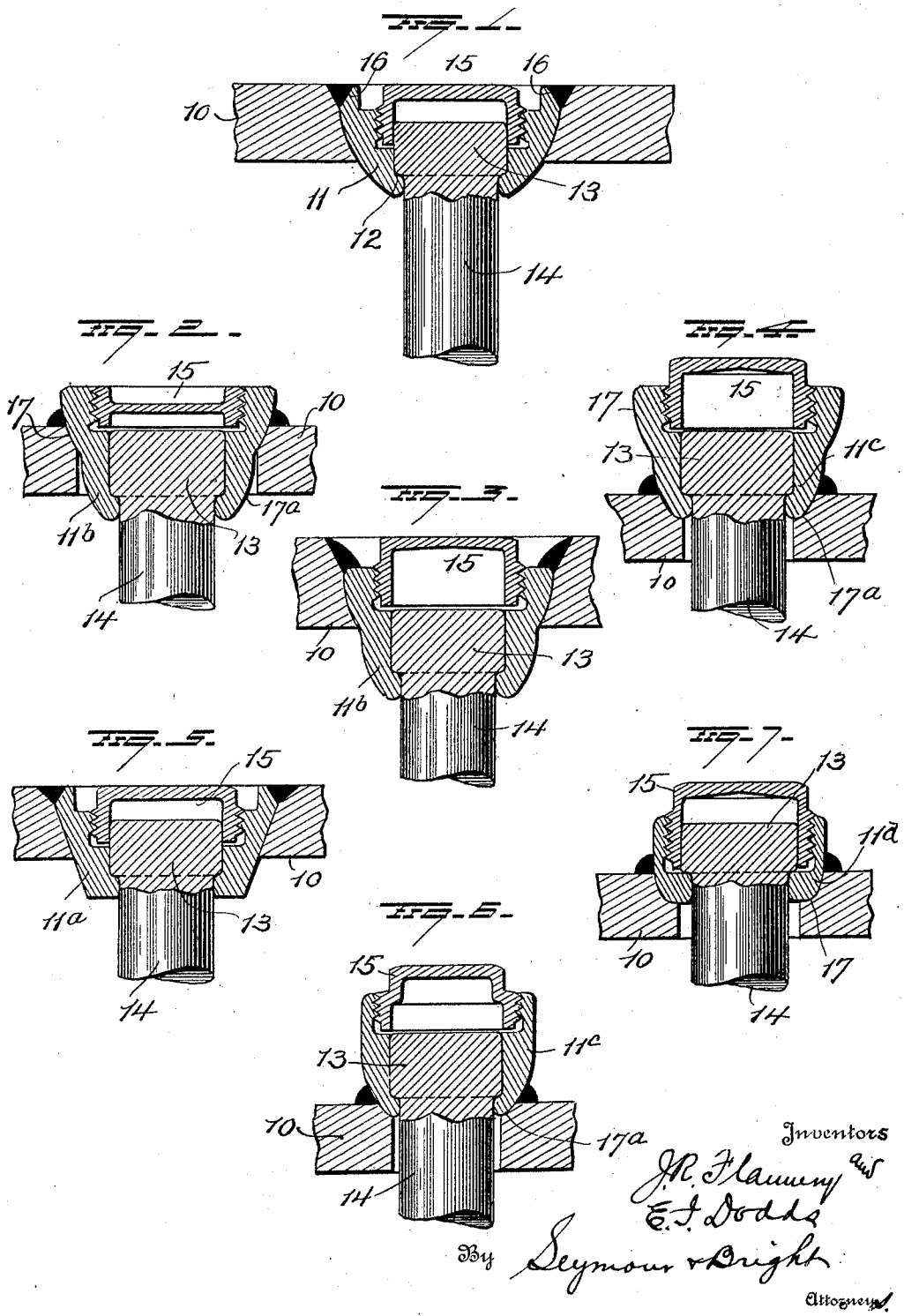

JOHN ROGERS FLANNERY, OF PITTSBURGH, PENNSYLVANIA, AND ETHAN I. DODDS, OF CENTRAL VALLEY, NEW YORK, ASSIGNORS TO FLANNERY BOLT COMPANY, OF PITTSBURGH, PENNSYLVANIA.

STAYBOLT STRUCTURE.

1,400,535.   Specification of Letters Patent.   Patented Dec. 20, 1921.

Application filed January 27, 1921. Serial No. 440,421.

*To all whom it may concern:*

Be it known that we, JOHN ROGERS FLANNERY and ETHAN I. DODDS, citizens of the United States, and residents of Pittsburgh and Central Valley, in the counties of Allegheny and Orange and States of Pennsylvania and New York, respectively, have invented certain new and useful Improvements in Staybolt Structures; and we do hereby declare the following to be a full, clear, and exact description of the invention, such as will enable others skilled in the art to which it appertains to make and use the same.

This invention relates to an improvement in stay bolt structures, the object being to provide means whereby the stay bolt may be initially adjusted to any position and then secured against lateral movement, but free to move longitudinally to accommodate itself to the movement of the boiler sheets to which it may be attached and it consists in the details of construction and combination of parts as will be more fully explained and pointed out in the claims.

In the accompanying drawings, Figure 1 is a view in section through the outer sheet of a boiler of the stay bolt, bearing and the bolt, and Figs. 2 to 7 inclusive are views of modified forms.

10 represents the outer sheet of the boiler provided with an opening for the stay bolt, the walls of said opening being curved as in Fig. 1—or straight as in Fig. 5. In the construction as shown in Fig. 1 the walls of the opening are curved in the arc of a circle, and the bolt bearing member 11 is semispherical in shape and is seated therein with its outer surface flush or approximately so with the outer face of sheet 10. This bearing member 11 is provided centrally with an opening for the passage of the bolt, and with a seat 12 for the head 13 of the bolt 14, the bore or recess in the bearing member being cylindrical in shape to receive the cylindrical head 13 of the bolt 14.

The bearing member 11 is provided with internal threads to be engaged by external threads on the cap 15 so that when the cap 15 is in place its outer face will be substantially flush with the outer surface of the sheet 10. The outer edge of the bearing member 11 is beveled as shown at 16 and the adjacent edge of the sheet 10 is similarly beveled, so that when the bearing member is placed in position a V-shape groove is formed into which a welding compound is fused to weld or permanently unite the bearing member 11 and sheet 10. When the parts are so secured the bolt, the inner end of which is secured to the inner sheet (not shown) in the usual manner, is free to expand and contract longitudinally or be moved longitudinally by the movements of the boiler sheets.

The construction shown in Fig. 5 is identical with that shown in Fig. 1 except that the wall of the opening and the outer surface of the bearing member 11$^a$ is straight instead of curved.

In the construction shown in Fig. 2 the outer surface of the bearing member 11$^b$ is composed of two parallel peripheral convex surfaces, 17 and 17$^a$ the latter being of less diameter than the other.

In Fig. 2 the wall of the bolt opening is enlarged or curved adjacent the outer surface of the sheet 10 to form a concave bearing for the upper convex surface 17, and bearing member 11$^b$ may rest therein with its outer face projecting beyond the outer surface of the sheet as shown in Fig. 2; or the bolt opening may be enlarged as in Fig. 3 to provide for a flush attachment, or the bolt hole may be made smaller, and its outer edge recessed to receive the small convex surface 17$^a$ of the bearing member 11$^b$ as shown in Fig. 4.

Instead of making the outer surface of the bearing member or sleeve of two parallel convex surfaces one of less diameter than the other as shown, in Figs. 2, 3 and 4, the bearing member 11$^c$ may be rounded at its lower end only, as in Fig. 6, and seated within a shallow counterbore in the outer surface of the sheet 10 or in a deeper counterbore as Fig. 7. In the latter figure we have shown the inner end of the bearing member or sleeve 11$^d$ made flat to rest solidly on the shoulder 17.

In the construction shown in Figs. 1, 2, 3, 4, 6 and 7, the bearing member or sleeve can be initially adjusted so that its long axis will be parallel with the long axis of the bolt, and in all of them the bearing member or sleeve is secured to the outer sheet by a weld 18 between the contacting points of the bearing member and outer sheet 10, and also in all of them the bolt may move longitudinally in the bearing member or in the cap 15 of the latter as shown in Fig. 7, to accommodate itself to the movements of the boiler sheets to which it is secured.

It is evident that many slight changes might be resorted to in the relative arrangement of parts shown and described without departing from the spirit and scope of our invention hence we would have it understood that we do not wish to confine ourselves to the exact construction and arrangement of parts shown and described but, Having fully described our invention what we claim as new and desire to secure by Letters-Patent, is:—

1. In a stay bolt structure, the combination of a boiler sheet having a bolt opening, a bearing member welded to said sheet within the opening and provided with a cylindrical bore and a bolt having a cylindrical head mounted in said bore and movable longitudinally therein.

2. In a stay bolt structure, the combination of a boiler sheet having a bolt opening, a bearing member welded to said sheet within the opening and provided with a cylindrical bore, a bolt having a cylindrical head mounted in said bore and movable longitudinally thereon and a cap screwed to said bearing member.

3. In a stay bolt structure, the combination of a boiler sheet having a concave opening therein, a convex bearing member mounted in said opening and welded to the boiler sheet, the said bearing member having a cylindrical bore, and a bolt having a cylindrical head mounted in said bore and free to move longitudinally therein.

In testimony whereof, we have signed this specification in the presence of the subscribing witness.

JOHN ROGERS FLANNERY.
ETHAN I. DODDS.

Witness:
EDWIN S. RYCE.